July 19, 1966  R. BINDER  3,261,438
VARIABLE RATIO CLUTCH RELEASE LEVER MECHANISM
Filed May 27, 1964  2 Sheets-Sheet 2

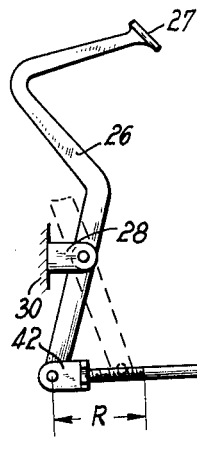

INVENTOR
Richard Binder
By Richard Lund
Ag't

United States Patent Office 3,261,438
Patented July 19, 1966

3,261,438
VARIABLE RATIO CLUTCH RELEASE LEVER MECHANISM
Richard Binder, Schweinfurt (Main), Germany, assignor to Fichtel & Sachs A.G., Schweinfurt (Main), Germany, a corporation of Germany
Filed May 27, 1964, Ser. No. 370,440
Claims priority, application Germany, June 1, 1963, F 39,898
9 Claims. (Cl. 192—99)

This invention relates to clutches of the automotive type, such as friction clutches, and more particularly to a release linkage for connecting the clutch to a clutch pedal and the like, and to the interaction between the pedal and the clutch provided by the linkage.

It is a common feature of the automotive clutches with which this invention is concerned that they are normally held in an engaged position by strong clutch springs. The clutch is released by foot pressure on a pedal which must overcome the force of the springs. The resistance of the springs to movement of the pedal normally increases with pedal displacement so that highest foot pressure is required when the clutch is about to reach the fully disengaged position, and foot pressure is lowest when movement from the engaged to the released position begins.

In automotive vehicles having strong engines, the torque to be transmitted by the clutch requires very heavy clutch springs, and the force required to overcome them is substantial. Holding the clutch in the released position against such springs is tiresome. The relatively low pressure needed for starting the releasing movement of the clutch favors slipping of the clutch and the ensuing rapid wear of friction facings under the weight of a driver's foot without consciously applied pedal pressure.

The object of the invention is a clutch arrangement provided with a linkage which overcomes the difficulties outlined above in a very simple, yet effective manner.

More specifically, it is an object of the invention to reduce the overall amount of energy required for moving a clutch from the engaged to the released position.

Another object is the reduction of the force necessary for holding the clutch in the released position.

A further object is the avoidance of unintentional slipping of the clutch.

With these and other objects in view, the invention provides a very simple clutch release linkage between a clutch pedal and the like and a clutch for moving the clutch from the engaged to the released position when the pedal moves from an inoperative to the operative position against spring pressure. The mechanical advantage of the applied pedal pressure increases in this linkage while the mechanical advantage of the opposing spring pressure decreases during the joint movement of the pedal and the clutch which leads to release of the clutch.

Other features and many of the attendant advantages of this invention will be readily appreciated as the same becomes better understood from the following description of preferred embodiments with reference to the attached drawing in which:

FIG. 1 shows only as much of a motor car equipped with the clutch arrangement of the invention as is needed for an understanding of this invention, the view being in side elevation;

FIG. 2 shows a portion of the apparatus of FIG. 1 in a different operational position;

FIG. 3 shows a modified detail of the apparatus of FIGS. 1 and 2; and

Figure 4:
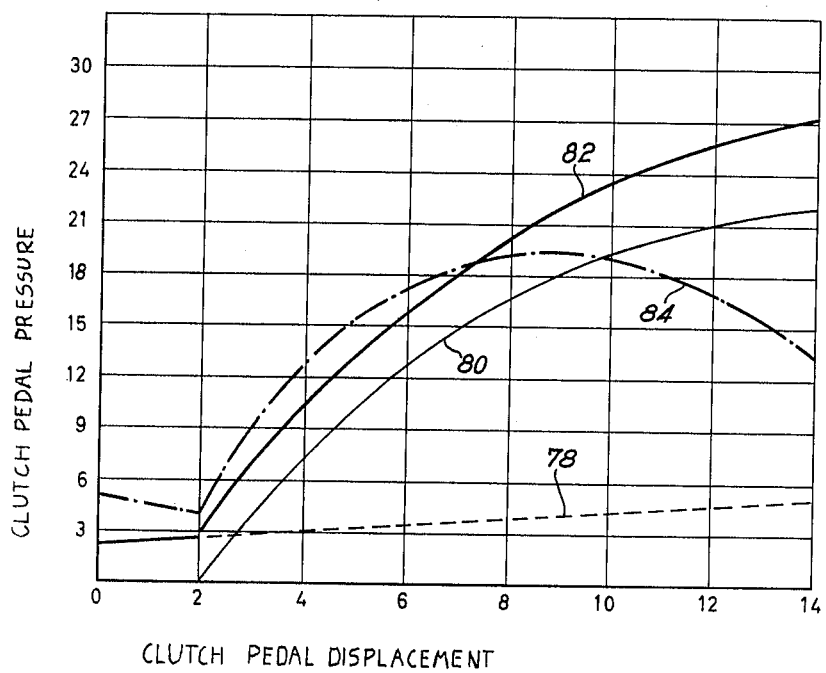
FIG. 4 is a diagram of characteristic operating curves of the apparatus of FIGS. 1 and 2.

Referring now to the drawing in more detail, and initially to FIG. 1, there is shown a friction clutch 10 of a conventional automotive type, a clutch pedal 26, and a clutch release linkage 34 which transmits movement between the pedal and the clutch.

The clutch includes a flywheel 12 which is an element of an internal combustion engine, not otherwise shown, and fixedly fastened on the non-illustrated crankshaft of the engine. A clutch disk 14 is axially slidable on the non-illustrated transmission main drive pinion of the multiple speed transmission (not shown) which is interposed between the clutch and the wheels of the vehicle. The disk 14 is secured against rotation on the pinion.

Several helical pressure springs 16 of which only one is shown in the drawing, normally urge an annular pressure plate 18 against the clutch disk 14 and thereby force the disk 14 into contact with the flywheel 12. The clutch is engaged as shown in FIG. 1. The clutch is disengaged by a clutch release bearing 22 which is axially slidable on the non-illustrated transmission main drive pinion. When the bearing 22 moves toward the left from the position shown in FIG. 1, it pivots toggle levers 20 to withdraw the pressure plate 18 and to thereby disengage the clutch 10. The structure described so far is entirely conventional, and its operation is fully familiar to those skilled in this art.

A release actuating ring 24 is axially movable on the pinion for urging the bearing into its clutch releasing position. Movement of the ring 24 is actuated by the clutch pedal 26, itself also conventional and carrying a foot pad 27. The pedal is attached to the body 30 of the car by a pivot 28. The linkage 34 which connects the pedal to the bearing 22 and includes the ring 24 has a front section 36 near the pedal, and a rear section 38 closer to the clutch. The front section includes a rigid rod 40 which is hingedly connected to the pedal 26 by a fork 42 threadedly adjustable on one end of the rod. The other end of the rod is attached to one corner of a flat plate 46 by a pivot pin 44. Because of the hinged connections between the rod 40, the pedal 26, and the plate 46, the rod 40 can only transmit longitudinal forces, and actually transmits longitudinal compressive forces only.

The plate 46 has the approximate shape of an equilateral triangle. Another corner of the plate is secured to the body 30 of the motor car by a pivot pin 47 and a bracket 48. One end of another rigid, compression transmitting rod 50 is attached to the third corner of the plate 46 by a pivot pin 52, and carries a threadedly adjustable nut 56 on its other end 54. The nut has a spherical face, and is held in its adjusted position by a lock nut 58.

The spherical face of the nut 56 conformingly engages a socket 60 on one arm of a lever 62 pivoted on the car body 30 by a bracket 64. The other arm of the lever 62 has a cylindrically shaped recess 66 which hingedly engages a conforming abutment portion of the ring 24.

A helical return spring 68 has two ends respectively attached to the car body 30 and to a lug 70 on the lever 62 in such a manner as to urge the pedal 26 and the linkage 34 into the clutch engaging position of FIG. 1 in which the ring 24 does not interfere with engagement of the disk 14 with the flywheel 12 under the urging of the clutch springs 16.

The triangular plate 46, in effect, constitutes a two-armed lever. One of its arms is defined by the axes of the pivot pins 44, 47, the other arm by the axes of the pins 47, 52. The two arms are angularly offset about the pivot axis of the lever, that is, the axis of the pin 47.

In the engaged position of the clutch 10, and the corresponding inoperative position of the clutch pedal 26 and of the clutch release linkage 34 illustrated in FIG. 1, the longitudinal axis of the compression rod 40 which passes through the pivot axes of the fork 42 and of the pin 44 at right angles to the lever arm defined by the pins 47, 52, is at its smallest distance $l_1$ from the lever axis at 47. The longitudinal axis of the compression rod 50 simultaneously is at a distance $L_1$ from the lever axis. The distance $L_1$ is equal or substantially equal to the maximum distance between the axis of the rod 50 and the lever axis at 47 in any operative position of the clutch release linkage.

The clutch 10 is released by pressure applied to the foot pad 27 of the pedal 26 in the usual manner. The pedal is thereby pivoted into a position partly indicated in dotted lines in FIG. 1, and more fully shown in FIG. 2 which illustrates the operative position of the principal elements of the clutch release linkage 34. The clutch 10 and the release actuating ring 24 have been omitted from the showing of FIG. 2 since their corresponding positions are obvious.

Full depression of the clutch pedal 26 within the limits set by abutting engagement of elements in the clutch 10 causes the plate 46 to be shifted through an angle of about 60°, whereby the distance between the axis of rod 40 and the pin 47 has been increased to a maximum value of $l_2$ approximately equal to the spacing R between the pins 44 and 47 and to the spacing of the operative and inoperative positions of the fork 42, whereas the spacing between the axis of the rod 50 and the lever axis through the pin 47 has been reduced to its minimum value $L_2$, the axis of the rod 50 being approximately perpendicular to the lever arm defined by the pins 44, 47.

Movement of the pedal 26 from the inoperative position of FIG. 1 to the operative position of FIG. 2 is permanently opposed by the return spring 68, and is additionally opposed by the clutch springs 16 as soon as pressure is effectively transmitted from the actuating ring 24 by the clutch release bearing 22 to the toggle levers 20 of which only one is seen in FIG. 1.

During movement of the clutch pedal 26 from the inoperative to the operative position, foot pressure on the pedal is applied through a lever arm the length of which gradually increases from $l_1$ to $l_2$. The opposing forces of the springs 16 and 68 act correspondingly through a lever arm whose effective length decreases from $L_1$ to $L_2$. In the illustrated embodiment of the invention, the lever arm ratio $l_2:L_2$ is more than three times, and almost four times the lever arm ratio $l_1:L_1$, and the foot pressure applied to the clutch pedal thus operates against the combined pressure of the springs with a mechanical advantage which is three to four times higher in the operative condition of the clutch release mechanism than in the inoperative condition.

FIG. 4 is a plot of clutch pedal displacement from the inoperative position versus foot pressure necessary for causing further displacement toward the operative position. The pedal displacement is plotted as the abscissa in arbitrary units of angle, whereas the foot pressure is plotted as the ordinate in arbitrary units of force.

The gently sloping line 78 shows the gradual increase of necessary pedal pressure with pedal displacement when the clutch release linkage 34 is separated from the clutch 10, and when the rods 40 and 50 are released from the plate 46 and are rigidly connected in line. Under these conditions, the resistance of the spring 68 increases as the spring is being strained by the movement of the lever 62, and the foot pressure increases proportional to th spring strain.

With the rods 40, 50 still rigidly connected in line and the spring 68 unhooked from the lug 70, the clutch release mechanism 34 was assembled with the clutch 10, and the change in pedal pressure with pedal displacement was measured. While the pedal moved from position 0 to position 2 in FIG. 4, the actuating ring 24 moved from the inoperative position shown in FIG. 1 into engagement with the clutch release bearing 22, whereupon further pedal movement was opposed by the clutch springs 16. The increase of pedal pressure during clutch disengagement is represented by the curve 80 which is substantially the characteristic curve of the clutch springs. Pedal pressure steadily increases from the position 2 to the fully disengaged clutch position represented by the pedal position 14.

When the return spring 68 was attached to the lug 70 without other changes in the device employed for the measurements of curve 80, foot pressure increased with pedal displacement as indicated by the line 82 whose first portion is identical with the corresponding portion of the line 78 whereas the remainder of line 82 shows the superposition of the return spring force represented by line 78 and of the clutch spring force represented by the line 80.

The condition of the apparatus illustrated in FIGS. 1 and 2 was then restored and the rods 40, 50 were hingedly connected by the plate 46. The variation of pedal pressure with pedal displacement as influenced by the change in mechanical advantage in the clutch release linkage of the invention is indicated by the chain-dotted line 84.

The initial resistance of the pedal to foot pressure is twice as high as with a rigid linkage between the pedal 26 and the lever 62. The mere weight of a foot on the clutch pedal is less apt to displace the pedal. After engagement of the actuating ring 24 with the clutch release bearing at pedal displacement 2, the pedal pressure necessary for starting movement of the toggle levers 20 is significantly higher than that required with a rigid linkage illustrated by curve 82.

Maximum pedal pressure is reached at displacement 9 before the clutch is fully disengaged, and is substantially lower than the highest pressure needed to release the clutch with a rigid connection between the rods 40, 50. Movement of the pedal into the fully disengaged clutch position from position 9 encounters a steadily decreasing opposing pressure. Relatively little foot pressure is required to hold the clutch fully disengaged.

It is thus seen that the clutch release linkage of the invention reduces the overall energy required for releasing the clutch. This energy is represented in FIG. 4 by the areas under the curves 82 and 84. The area under curve 84 is significantly smaller than that under curve 82. As is further evident from FIG. 4, the maximum effort required during clutch release is lower with the linkage of the invention than with a rigid connection between the rods 40, 50 under otherwise identical conditions. The linkage of the invention inherently discourages unnecessary slipping clutch engagement in which the clutch disk 14 frictionally engages the flywheel 10 while rotating relative to the flywheel, a prime cause of excessive clutch facing wear.

Many modifications and variations of the invention are possible in the light of the above teachings, and will readily suggest themselves to those skilled in the art. Rigid mechanical links and levers may be replaced by their hydraulic equivalents as is illustrated in FIG. 3 with respect to the clutch pedal. Instead of providing a rigid connection between the foot pad 27 and the hingedly attached fork 42 on the rod 40, the foot pad 27, not itself shown in FIG. 3, may be connected to the rod 40 by a hydraulic circuit of which only an actuating cylinder 72 and a piston 74 are illustrated.

It will be understood that the hydraulic system further includes a master cylinder operated by a foot pad in the manner customary in hydraulic brake systems, and that the master cylinder is connected with a portion of the cylinder 72 above the piston 74 which is not shown in the fragmentary view of FIG. 3. The rod 40 constitutes the connecting rod of the piston 74, and is pivotally attached to the piston by a floating pin in the hollow interior of the piston as is conventional and not visible in FIG. 3.

The triangular plate 46 is attached to an integral portion of the cylinder 72 by a pivot pin 76. The operation of the modified clutch release mechanism is so closely similar to that of the fully mechanical mechanism described with reference to FIGS. 1 and 2 as to make a separate description unnecessary.

Under most conditions of passenger car or truck operation it is most advantageous to make the lever arm ratio $l_2:L_2$ at least three times, and preferably three to four times the ratio $l_1:L_1$, but many of the advantages of the clutch release linkage of the invention are achieved when the final ratio $l_2:L_2$ is at least two times the initial ratio $l_1:L_1$.

The actual shape of the lever interposed between the rods 40 and 50 is not relevant to the invention, but a triangular shape has obvious advantages where three pivots are to be kept in a fixed spatial relationship. Similarly, straight slender rods are preferred for providing a rigid compression link between two pivots, but the actual shape of the compression members 40, 50 may be varied in any desired manner without departing from the spirit of the invention. The term "rod means" as employed in the appended claims thus is not necessarily limited to an elongated or straight structural element.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. In a clutch arrangement, in combination:
   (a) a clutch movable between an engaged and a released position;
   (b) clutch pedal means movable between an inoperative and an operative position;
   (c) clutch release linkage means moving said clutch from the engaged to the released position when said pedal means moves from the inoperative to the operative position, said linkage means including
      (1) a lever member mounted for movement about a fixed pivot axis between an operative and an inoperative position,
      (2) two pivot means on said lever member having respective axes,
      (3) first rod means connecting said pedal means and one of said pivot means for joint movement of said lever member and of said pedal means between the operative and inoperative positions thereof,
      (4) second rod means connecting said clutch and the other pivot means for joint movement of said lever member and of said clutch from the operative position of the lever member and the released position of said clutch to the inoperative position of the lever member and the engaged position of the clutch, and vice versa,
      (5) said rod means including respective rod members having respective first portions attached to the associated pivot means, second portions hingedly secured to said pedal means and said clutch respectively, and respective axes connecting said first and second portions thereof and spaced from said pivot axis during said movement of the lever member,
      (6) the spacing of the axis of said first rod member from said pivot axis in the inoperative position of said lever member being substantially smaller than the spacing of the axis of said second rod member from said pivot axis, and
      (7) the spacing of the axis of said first rod member from said pivot axis in the operative position of said lever member being substantially greater than the spacing of the axis of said second rod member from said pivot axis; and
   (d) yieldably resilient means permanently urging said lever member to move from said operative toward said inoperative position thereof.
2. An arrangement as set forth in claim 1, wherein the ratio of the greater one to the smaller one of said spacings is substantially greater in said operative position of said lever member than in said inoperative position of the lever member.
3. In an arrangement as set forth in claim 2, said ratio in said operative position of said lever member being at least twice the ratio in said inoperative position of said lever member.
4. In an arrangement as set forth in claim 2, said ratio in said operative position of said lever member being three to four times the ratio in said inoperative position of said lever member.
5. In an arrangement as set forth in claim 1, means for varying the effective spacing of said first and second portions of at least one of said rod members.
6. In an arrangement as set forth in claim 1, said lever member being constituted by a triangular plate member.
7. An arrangement as set forth in claim 1, wherein said pivot axis and the axes of said pivot means define a substantially equilateral triangle.
8. An arrangement as set forth in claim 7, wherein the axis of said first rod member is substantially perpendicular to the side of said triangle defined by said pivot axis and the axis of said other pivot means in said inoperative position of said lever member.
9. An arrangement as set forth in claim 8, wherein said second portions are spaced from the corresponding first portions in substantially opposite directions, and the second portion of each rod member is spaced from the corresponding first portion in a direction away from the first portion of the other rod member, said axes of the rod members being spaced from said pivot axis in a common direction.

References Cited by the Examiner
UNITED STATES PATENTS

| | | | |
|---|---|---|---|
| 2,076,047 | 4/1937 | Scott | 74—516 X |
| 2,275,158 | 3/1942 | Nutt | 192—89 |
| 2,400,765 | 5/1946 | McMillan | 192—99 X |
| 3,092,229 | 6/1963 | Uher | 192—99 X |

DAVID J. WILLIAMOWSKY, *Primary Examiner.*
DON A. WAITE, *Examiner.*
B. WYCHE, *Assistant Examiner.*